United States Patent

Fischman

[15] 3,678,331

[45] July 18, 1972

[54] SAWTOOTH CURRENT GENERATOR

[72] Inventor: Martin Fischman, Wantagh, N.Y.

[73] Assignee: GTE Laboratories Incorporated

[22] Filed: Jan. 22, 1970

[21] Appl. No.: 5,062

[52] U.S. Cl. ........................................315/27 TD, 331/117

[51] Int. Cl. ........................................................H01j 29/70

[58] Field of Search......................315/27 TD, 27 R, 27 RD; 331/117; 307/228

[56] References Cited

UNITED STATES PATENTS

| | | | |
|---|---|---|---|
| 3,391,353 | 7/1968 | Fischman | 331/117 |
| 3,167,682 | 1/1965 | Bender | 315/27 TD |
| 3,286,199 | 11/1966 | Skilling | 331/117 |

*Primary Examiner*—Benjamin R. Padgett
*Assistant Examiner*—J. M. Potenza
*Attorney*—Irving M. Kriegsman

[57] ABSTRACT

A sawtooth current generator is disclosed which provides a linear time varying current for the coil of a magnetic deflection system of a television display tube. The coil is coupled to the collector of a transistor and the transistor is coupled to a resonant circuit which provides feedback to sustain the circuit oscillations and to actuate the transistor. In addition, a diode is coupled to the collector of the transistor. A constant voltage is maintained across the inductor by the alternate conduction of the transistor and the diode so that a linear time varying current flows in the inductor.

7 Claims, 7 Drawing Figures

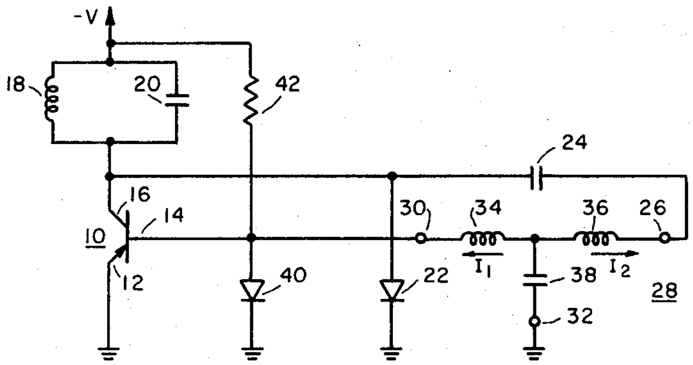
Fig. 1.
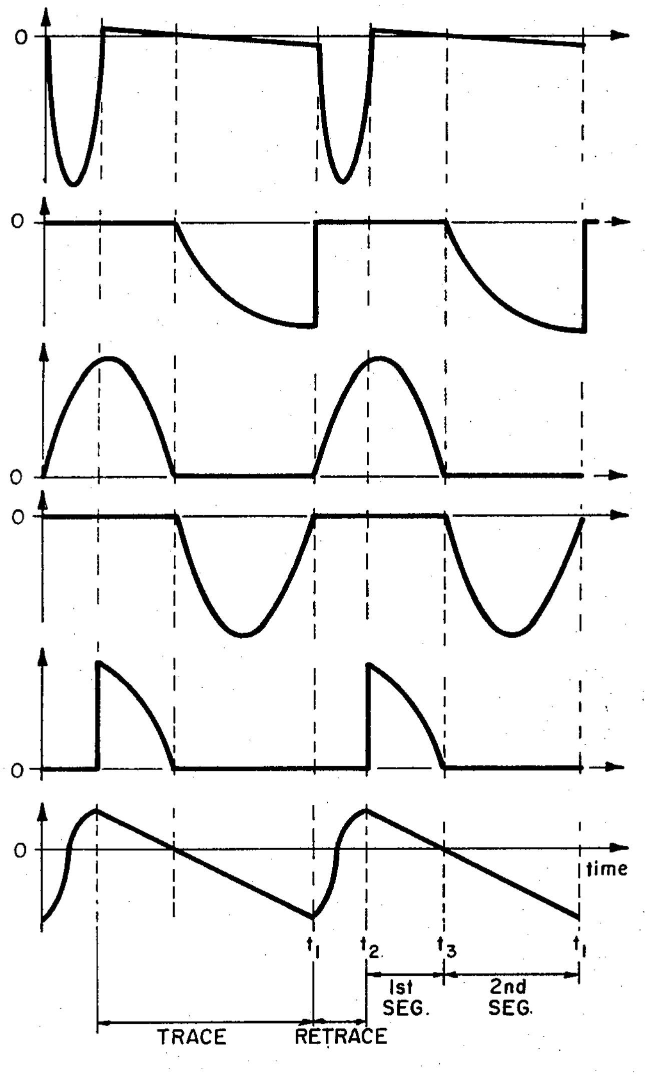
Fig. 2a Fig. 2b Fig. 2c Fig. 2d Fig. 2e Fig. 2f
Fig. 2a
COLLECTOR-EMITTER VOLTAGE
Fig. 2b
COLLECTOR CURRENT
Fig. 2c
DIODE 40 CURRENT
Fig. 2d
BASE CURRENT
Fig. 2e
DIODE 22 CURRENT
Fig. 2f
INDUCTOR 18 CURRENT
INVENTOR.
MARTIN FISCHMAN
R. J. Frank
ATTORNEY.

SAWTOOTH CURRENT GENERATOR

BACKGROUND OF THE INVENTION

The invention relates to sawtooth current generators of the type employed to energize magnetic deflection systems for cathode ray tubes.

Generators designed to provide sawtooth current output signals find wide application in magnetic deflection systems for television scanning and other electronic apparatus. Television scanning consists of causing an electron beam to sweep over an image area in a series of straight parallel lines. If the scanning pattern generated by the displacement of the electron beam is resolved into its vertical and horizontal components, it is seen that both components exhibit a sawtooth variation in displacement with respect to time; the period of the sawtooth wave representing vertical displacement being equal to the time required for the scanning beam to cover the entire image area, the period of the horizontal sawtooth being equal to the time required by the scanning beam to produce one scan line. This deflection can be produced by a pair of mutually perpendicular electrostatic or magnetic fields established near the source of the electron beam. Present day television systems generally employ magnetic deflection due to the difficulties in tube design and higher tube costs associated with an electrostatic system.

A magnetic deflection system generally comprises a retrace capacitor and a pair of magnetic coils arranged in a deflection yoke adjacent to the source of the electron beam to provide deflection along mutually perpendicular axes. The current through these coils must increase linearly with respect to time during the scanning or trace period and then return abruptly to its initial value during the retrace period. I have invented a magnetic deflection system which provides the required magnetic field, exhibits good frequency stability and employs relatively few components.

SUMMARY OF THE INVENTION

The sawtooth current generator of the present invention comprises an inductance means, capacitance means and first switching means, coupled to a semiconductor switching element. The semiconductor switching element is provided with first, second and third electrodes and the inductance and capacitance means are each provided with first and second terminals. The inductance means is coupled between the third electrode of the switching element and an operating voltage source while the capacitance means is connected in parallel with the inductance means. The first switching means is coupled between the first and third electrodes of the switching element, the first electrode of the switching element being coupled to a reference potential.

In addition, feedback circuit comprising resonant circuit means having first, second and third terminals coupled to the first, second, and third electrodes respectively of the switching element is provided to maintain the generator in oscillation. During one half-cycle of oscillation, the direction of current flow at the second terminal of the resonant circuit means is such as to render the switching element conductive. During the other half-cycle, the direction of current flow at the second terminal reverses driving the switching element into its non-conductive state. During the half-cycle in which current flows out of the second terminal of the resonant circuit means it also flows out of its third terminal; conversely, current flows into both the second and third terminals of the resonant circuit means during the opposite half-cycle.

The operation of the circuit is best understood by assuming that the circuit has been operating for a sufficient period of time so that a steady state operating condition has been established and initial transients have died down. Further, it is assumed that the switching element is conducting due to the direction of the current flow at the second terminal of the resonant circuit means and a current which varies linearly with time flows in the inductance means causing energy to be stored therein. Upon reversal of the direction of current flow at the second terminal of the resonant circuit means, the switching element becomes nonconductive. Simultaneously, energy which had been stored in the inductance means is transferred to the capacitance means at the characteristic frequency of the inductance-capacitance combination. The time during which this energy transfer takes place is referred to as the retrace period.

Energy transfer between the inductance and capacitance means continues until the first switching means, which is coupled between the inductance means and the reference potential is rendered conductive, thereby coupling the inductance means to the reference potential. Consequently, the voltage across the inductance means is maintained substantially equal to the operating voltage causing a current which varies linearly with respect to time to flow through the inductance and first switching means.

Current flow through the first switching means continues until the next half-cycle of the resonant current when the direction of current flow at the second and the third terminals of the resonant circuit means reverses rendering the switching element conductive and the first switching means nonconductive. The inductance means is now coupled to the reference potential through the switching element. Therefore, a substantially constant voltage is maintained across the inductance means and the current flowing through the inductance means continues to vary linearly with respect to time.

The interval during which a linearly varying current flows through the inductance means is referred to as the trace period. The trace period may conveniently be divided into two segments, the first segment being the interval during which the inductance means is coupled to the reference potential through the first switching means and the second segment the interval during which it is coupled to the reference potential through the switching element.

In one embodiment of the invention, the inductance means is one coil of the deflection yoke of a cathode ray or television display tube and the capacitance means is the retrace capacitor, the current through the coil providing magnetic deflection for the electron beam.

Further features and advantages of the invention will be more readily apparent from the following detailed description of a specific embodiment thereof when viewed in conjunction with the accompanying drawings.

BRIEF DESCRIPTION OF THE DRAWINGS

FIG. 1 is an electrical schematic of an embodiment of the invention.

FIGS. 2(a)–2(f) show representative waveforms at various points in the embodiment of FIG. 1.

DESCRIPTION OF THE PREFERRED EMBODIMENT

Referring now to FIG. 1, there is shown a sawtooth current generator comprising a semiconductor switching element shown as a type PNP transistor 10 having emitter, base and collector electrodes 12, 14 and 16 respectively. The emitter is coupled to a reference potential or ground. A parallel circuit, consisting of inductor 18 and capacitor 20, is coupled between the collector of transistor 10 and a negative operating voltage source, −V. A diode 22 coupled between the collector of transistor 10 and the reference potential is poled to provide a low impedance path therethrough when the collector of transistor 10 is more positive than the reference potential.

The collector 16 of transistor 10 is also coupled to d.c. blocking capacitor 24 which in turn is coupled to the third terminal 26 of resonant circuit 28. The base 14 of transistor 10 is coupled to the second terminal 30 of resonant circuit 28 while the first terminal 32 of the resonant circuit is coupled to the reference potential. The resonant circuit consists of inductors 34 and 36 connected in series between terminals 26 and 30 and a capacitor 38 connected between the junction of inductors 34 and 36 and terminal 32. In addition, diode 40 coupled between the base of transistor 10 and the reference potential is poled to provide a low impedance path to ground during the time that transistor 10 is nonconducting.

Resistor 42 coupled between the negative operating voltage source and the base of transistor 10 is provided to initiate conduction of transistor 10 and to initially supply energy to resonant circuit 28. Once the generator is in normal operation, this conductive path is no longer required for circuit operation.

The operation of the circuit is best described by assuming that the generator has been operating for a sufficient number of cycles so that initial starting transients have subsided. Under these conditions, energy in resonant circuit 28 is alternately transferred between inductors 34 and 36 and capacitor 38 at the characteristic frequency of oscillation of the resonant circuit. Due to the phase shift from the collector to the base of transistor 10 and the gain of transistor 10, resonant circuit 28 maintains the sawtooth generator in oscillation. When the resonant circuit oscillates at its characteristic frequency the currents $I_1$ and $I_2$ simultaneously flow in the directions shown in FIG. 1 during one-half cycle and are reversed in direction during the following half-cycle.

Referring now to FIGS. 2(a)-2(f), just prior to time $t_1$ transistor 10 is conducting and a current which decreases linearly with time flows in inductor 18 causing energy to be stored therein. Currents $I_1$ and $I_2$ are flowing in directions opposite to that shown in FIG. 1. At time $t_1$, currents $I_1$ and $I_2$ reverse direction and flow in the direction shown in FIG. 1 thereby causing transistor 10 to switch into the nonconducting state. Diode 40 is driven into conduction and provides a low impedance to ground for current $I_1$ [FIG. 2(c)]. Energy which had been stored in inductor 18 is now transferred to capacitor 20 at the characteristic frequency of the inductor-capacitor combination. This energy transfer occurs during the retrace period and continues until time $t_2$ when the voltage at the collector 16 of transistor 10 becomes slightly positive causing diode 22 to conduct thereby providing a low impedance between the collector of transistor 10 and the reference potential.

The variation in collector voltage with respect to time, as shown in FIG. 2(a), consists of a sinusoidal portion occurring during the retrace period and a linear portion occurring during the trace period. In FIG. 2(a) the magnitude of the linear portion has been exaggerated relative to the sinusoidal portion for the sake of clarity. In actual operation, the collector voltage is maintained close to zero throughout the entire trace period. During the first segment ($t_2$ to $t_3$) of the trace period, diode 22 conducts holding the collector voltage close to the reference potential. Consequently, the voltage appearing across inductor 18 is approximately equal to the operating voltage and a linearly decreasing current flows through the inductor.

When the direction of currents $I_1$ and $I_2$ reverse during the following half cycle, transistor 10 is driven into conduction and diode 22 is driven into its nonconducting state. During this second segment of the trace period ($t_3$ to $t_1$) in which inductor 18 is coupled to the reference potential through transistor 10, the voltage appearing across the inductor is again approximately equal to the operating voltage. Therefore, the current through inductor 18 decreases during the second segment of the trace period at the same rate as during the first segment.

The current through diode 22, shown in FIG. 2(e), is the combination of current $I_2$ and the linear decreasing current flowing through inductor 18 during the first segment of the trace period. The current flowing through the collector of transistor 10, FIG. 2(b), is the combination of current $I_2$ and the linear decreasing current flowing through inductor 18 during the second segment of the trace period.

The generator frequency is not exactly equal to the resonant frequency of resonant circuit 28 because the timing of the sinusoidal pulse during the retrace period relative to the driving sine wave current to the base circuit of transistor 10 produces a phase shift between the sinusoidal pulse and the circulating resonant current. In order for these phase relationships to exist the resonant circuit must operate slightly off resonance. However, with a high Q resonant circuit, the generator operates very close to the resonant frequency.

The frequency stability of the generator is excellent being essentially determined by the resonant circuit 28. Switching occurs rapidly since transistor 10 is driven by a sinusoidal current of relatively large magnitude. In a typical circuit, the values of the components are as follows:

| | |
|---|---|
| Transistor **10** | Type 2N781 |
| Inductor **18** | 1.0 mh |
| Capacitor **20** | 370 pf |
| Diode **22** | Type 1N279 |
| Capacitor **24** | 0.1 $\mu$f |
| Inductor **34** | 10 mh |
| Inductor **36** | 20 mh |
| Capacitor **38** | 470 pf |
| Diode **40** | Type 1N279 |
| Resistor **42** | 47 K ohms |

In one application of this generator, inductor 18 is one deflection coil of the deflection yoke and capacitor 20 is the retrace capacitor of a cathode ray or television display tube.

What is claimed is:

1. A sawtooth current generator for producing a periodic sawtooth current, each period thereof being composed of a trace period having first and second segments and a retrace period, said generator comprising
   a. a semiconductor switching element having first, second and third electrodes, said first electrode being coupled to a reference potential,
   b. inductance means having first and second terminals, said first terminal being coupled to the third electrode of said switching element,
   c. capacitance means having first and second terminals, said capacitance means being coupled in parallel with said inductance means,
   d. first switching means having first and second terminals, said first and second terminals being coupled to the first and third electrodes respectively of said switching element, and
   e. resonant circuit means having first, second and third terminals, said first, second and third terminals being coupled respectively to the first, second and third electrodes of said switching element whereby a current which varies linearly with time flows through said inductance means during said trace period.

2. The generator of claim 1 further comprising second switching means having first and second terminals, said second switching means being coupled between the first and second electrodes of said switching element.

3. The generator of claim 2 wherein said first switching means is a first diode, said first diode being poled to provide a low impedance path between its first and second terminals during said first segment of the trace period.

4. The generator of claim 3 wherein said resonant circuit means comprises
   a. a first inductor having first and second terminals, said first terminal being coupled to the base of said transistor,
   b. a second inductor having first and second terminals, said first terminal being coupled to the collector of said transistor, said second terminal being coupled to the second terminal of said first inductor, and
   c. a capacitor having first and second terminals, said first terminal being coupled to a reference potential, said second terminal being coupled to the second terminal of said first inductor, said resonant circuit having a characteristic frequency of oscillation whereby the time at which the conducting state of said semiconductor switching element is changed is dependent upon said characteristic frequency of oscillation.

5. The generator of claim 4 wherein said semiconductor switching element is a transistor and said first, second and third electrodes are the emitter, base and collector electrode respectively.

6. The generator of claim 5 wherein said second switching means is a second diode, said second diode being poled to provide a low impedance path between its first and second terminals during the time in which the switching element is nonconducting.

7. The generator of claim 6 wherein said inductance means is a magnetic deflection coil and said capacitance means is a retrace capacitor for a television display tube.

* * * * *